United States Patent [19]

Schügerl et al.

[11] Patent Number: 4,775,479
[45] Date of Patent: Oct. 4, 1988

[54] PROCESS FOR SELECTIVELY RECOVERING GE AND AS FROM AQUEOUS SOLUTIONS

[75] Inventors: Karl Schügerl, Hemmingen; Wilfried Gutknecht, Hanover, both of Fed. Rep. of Germany

[73] Assignee: Metallgesellschaft AG, Frankfurt am Main, Fed. Rep. of Germany

[21] Appl. No.: 109,981

[22] Filed: Oct. 16, 1987

[30] Foreign Application Priority Data

Oct. 18, 1986 [DE] Fed. Rep. of Germany ....... 3635450

[51] Int. Cl.$^4$ .............................................. B01D 17/05
[52] U.S. Cl. .................................... 210/643; 210/708; 210/724; 210/749
[58] Field of Search ............... 210/643, 644, 708, 702, 210/724, 725, 729, 749, 757, 758; 423/89, 91, 92, 93, 98, 87

[56] References Cited

U.S. PATENT DOCUMENTS

| 3,779,907 | 12/1973 | Li et al. |
| 4,090,871 | 5/1978 | Lebleu et al. ........................ 423/92 |
| 4,409,078 | 10/1983 | Wagner et al. |
| 4,432,952 | 2/1984 | Schepper ............................ 423/89 |

Primary Examiner—Frank Sever
Attorney, Agent, or Firm—Herbert Dubno

[57] ABSTRACT

A process for extracting germanium and/or arsenic from an aqueous solution is described. In order to increase the yield and to perform a highly specific separating process, the liquid membrane technology is employed, in which the starting solution is adjusted by means of hydrochloric acid to a concentration in excess of 6 and up to 10 moles HCl/l, a polyisobutylenesuccinic anhydride/polyamine condensation product is used as a surfactant in the organic outer phase of the liquid membrane emulsion is adjusted to a pH value from 0 to 14 while a supply of chlorine ions is precluded.

10 Claims, 4 Drawing Sheets

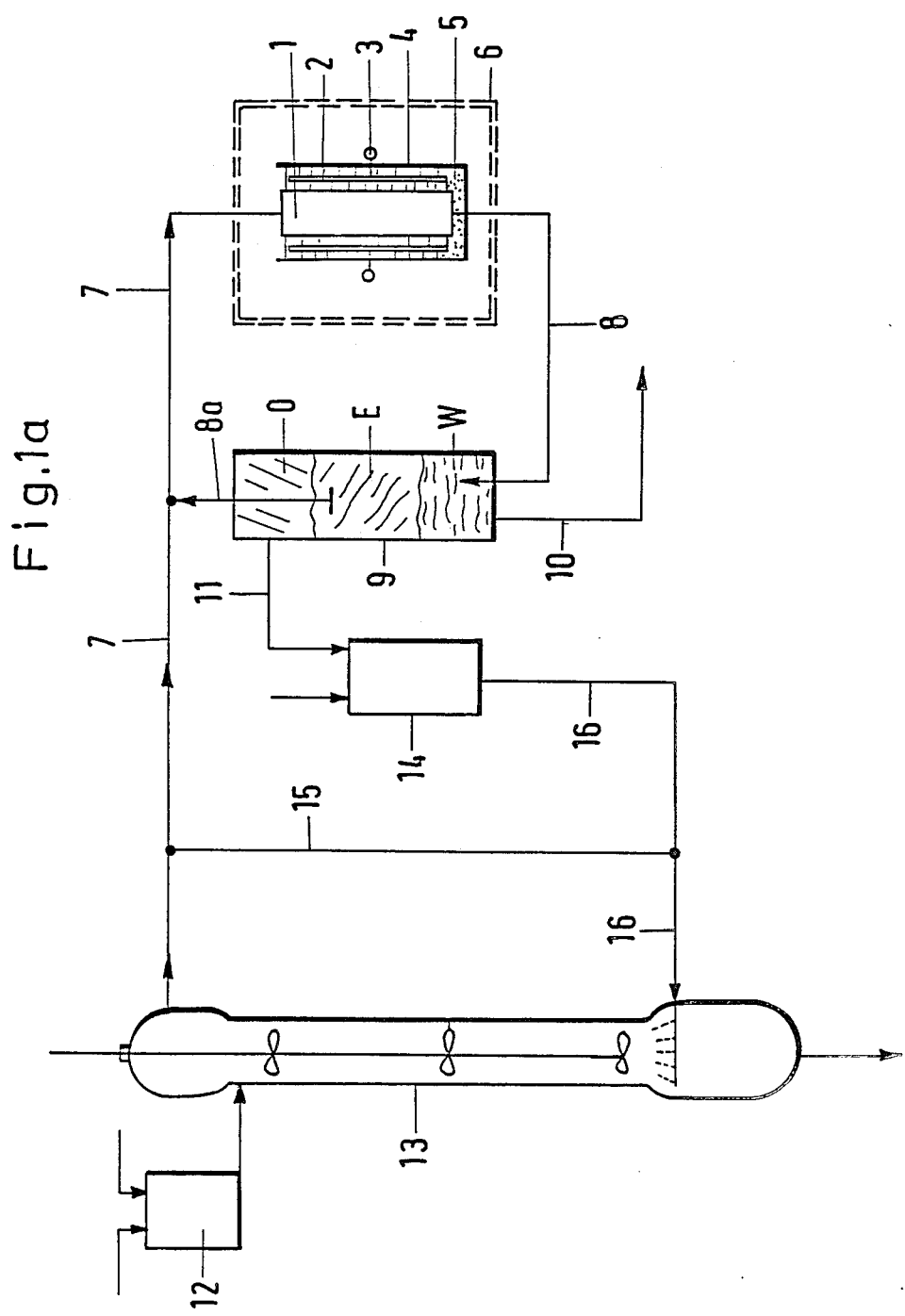

PROCESS FOR SELECTIVELY RECOVERING GE AND AS FROM AQUEOUS SOLUTIONS

FIELD OF THE INVENTION

Our present invention relates to a process for recovering germanium and/or arsenic from aqueous hydrohalic solutions by so-called liquid membrane technology.

BACKGROUND OF THE INVENTION

The constant development of optical fiber technology has given rise to an increasing demand for germanium and also of arsenic.

As high-germanium raw materials are available only in restricted quantities it is necessary to process raw materials which are low in germanium. The solutions resulting from the leaching of these raw materials contain small amounts of germanium and considerable quantities of other materials.

Different processes have been used thus far for separating and enriching germanium; these processes include precipitation with tannin and subsequent separation, extraction/re-extraction and ion exchange processes. The precipitation is very expensive and depends highly on the tannin which, as a natural product, varies in quality. In the extraction/re-extraction processes the organic phase must be retreated before it is reused. In ion exchange processes in columns, the ion exchange resin columns must be regenerated.

From the U.S. Pat. No. 3,779,907 it is known that solutes in aqueous systems can be extracted and can be processed for a recovery of the valuable substance. In the above-mentioned process a solute in an aqueous medium is removed by contacting the solution with a water-in-oil emulsion which consists of an aqueous inner phase which renders the solute unable to leave and a surrounding organic hydrophobic outer phase, which contains a surfactant.

That treatment results in a concentration gradient and causes the solute to penetrate the outer phase and to be transformed in the inner phase to a substance which is unable to penetrate the outer phase. After that contact, the emulsion is separated from the aqueous solution which has been depleted of the solute, and the emulsion can then be regenerated. The process of regenerating the emulsion comprises breaking the emulsion.

Certain reagents can be added to the solvent to render the organic phase permeable for substrates. The permeability may be selectively adjusted by the selection of the reagents and of the solvents.

Published German Application No. 28 29 163 discloses a process of recovering solutes from an aqueous solution by liquid membrane technology. In that process the emulsion which has been separated is exposed to an electrostatic field in order to coalesce (break) the droplets of the aqueous inner phase. The voltage gradient in the electrostatic coalescing zone exceeds about 1 kV/cm.

Numerous water-immiscible solvents have been proposed for the organic phase of the liquid membrane emulsion, which contain also a surfactant, such as sorbitemonolauric ester. The known process can be used to extract anionic and cationic substances but neither germanium nor arsenic has been disclosed or taken into account.

Published German Application No. 33 18 109 discloses a process of recovering zinc from heterogeneous sewage compositions. That process also comprises an extraction by means of a liquid membrane emulsion. The aqueous inner phase of the liquid membrane emulsion consists of an aqueous 1N to 6N mineral acid, preferably sulfuric acid, and the substances added to the membrane-forming phase include a surfactant consisting of sorbitmonolauric ester and a transfer agent consisting, e.g., of an organic phosphorous compound, such as bis-(2-ethylhexyl) phosphoric ester.

OBJECT OF THE INVENTION

It is the object of the invention to provide a continuously operable, cost-effective process for a selective recovery and enriching of germanium and/or arsenic from dilute solutions in such a manner that germanium and/or arsenic are recovered in a sufficiently pure form which can easily be processed further.

SUMMARY OF THE INVENTION

In accomplishing the object, the invention uses liquid membrane technology, wherein the aqueous solution of the substance to be recovered is contacted with an emulsion in which the droplets consisting of the aqueous inner phase are surrounded by a surfactant-containing organic outer phase which is not miscible with the aqueous solution and is permeable to the solute, the solute is permitted to penetrate through the surfactant-containing, organic outer phase and is rendered unable to penetrate in the aqueous inner phase, the emulsion is separated from the aqueous solution which has been depleted as regards the solute, the droplets of the aqueous inner phase in the separated emulsion are caused to coalesce by the exposure to an electrostatic field, the solute is recovered from the coalesced aqueous inner phase, and the depleted inner phase is re-emulsified with outer phase and is recycled.

In the process in accordance with the invention the process of liquid membrane technology is carried out in such manner that (a) an aqueous solution which contains germanium and/or arsenic and optional other metals is adjusted with hydrochloric acid to a concentration of more than 6 and preferably up to 10 moles HCl/liter and the metals are converted to germanium tetrachloride and arsenic trichloride;

(b) the organic outer phase of the liquid membrane emulsion contains as a surfactant a polyisobutylenesuccinic anhydride/polyamine condensation product, and (c) the aqueous inner phase of the liquid membrane emulsion is adjusted to a pH value from 0 to 14 and the entering germanium tetrachloride and/or arsenic trichloride is rendered unable to penetrate, with the proviso that a supply of chlorine ions is precluded.

In the process in accordance with the present invention the germanium and/or arsenic values can quickly and selectively be extracted from highly dilute solutions and can be virtually completely extracted by means of a relatively small quantity of the extracting phase. Owing to the nature and quantity of the components of the membrane-forming organic phase an effective breaking into oil and water phases can be effected.

In accordance with a further feature of the invention, hydrobromic acid rather than hydrochloric acid can be used a the hydrohalic acid and a corresponding concentration can be adjusted in the starting aqueous solution. In that case the bromides of $Ge^{IV}$ and/or $As^{III}$ will be formed as the respective halides.

In the process in accordance with the invention, dilute aqueous metal salt solutions which contain about 50 to 100 ppm germanium and/or arsenic and additional quantities of other metals, such as 20 g/l copper, 10 g/l zinc and about 10 g/l iron, are adjusted with hydrochloric acid to a concentration of about 6 to 10 times normality whereby germanium and arsenic are transformed into their chlorides.

The chlorides of $Ge^{IV}$ and $As^{III}$ represent solvent-soluble forms of germanium and arsenic. For a selective extraction and removal of the chlorides of germanium and/or arsenic from the hydrochloric aqueous starting solution in the process in accordance with the invention, the organic outer phase of the liquid membrane emulsion consists of a water-immiscible solvent or solvent mixture of the group saturated aliphatic hydrocarbons, aromatic and cycloaliphatic hydrocarbons, halogenated aliphatic hydrocarbons having 1 to 5 carbon atoms, halogenated liquid mononuclear aromatic hydrocarbons.

Suitable saturated aliphatic hydrocarbons include hexane, octane, dodecane, hexadecane, eicosane and kerosine.

Preferred aromatic and cycloaliphatic hydrocarbons are benzene, toluene, xylene, decalin and cyclohexane.

Among the halogenated aliphatic hydrocarbons having 1 to 5 carbon atoms, chloroform, carbon tetrachloride and tetrachlorethane are particularly suitable.

Chlorobenzene or chlorotoluene are preferred among the liquid halogenated mononuclear aromatic hydrocarbons.

The solvents may be used individually or in a mixture in preparing the membrane-forming organic phase. The membrane-forming organic phase preferably consists of a solvent mixture consisting of a predominantly straight-chained hydrocarbon having 16 to 10 carbon atoms, halogenated hydrocarbon having 1 to 5 carbon atoms and a mononuclear aromatic hydrocarbon.

A suitable agent or suitably composed membrane-forming organic phase for use in carrying out the process in accordance with the invention is, for instance, a solvent mixture consisting of

- 70 to 75% by volume of a predominantly straight-chained $C_{16}$ to $C_{20}$ hydrocarbon, such as hexadecane, eicosane or kerosine ($C_{10}$–$C_{16}$), and preferably kerosine,
- 20 to 25% by volume of a mononuclear aromatic hydrocarbon, such as benzene, toluene, xylene, and preferably toluene, and
- 1 to 5% by volume of a halogenated aliphatic hydrocarbon having 1 to 5 carbon atoms, such as chloroform, carbon tetrachloride, tetrachloroethane and preferably carbon tetrachloride.

For the preparation of a suitable liquid membrane emulsion, the organic phase must contain a surfactant. The surfactant which has proved to be particularly desirable in a process in accordance with the invention comprises a condensation product of PIBSA (polyisogutylenesuccinnic anhydride) and polyamine. Such product is commercially available, e.g. under the trademark Paranox ® 100 of Esso Chemical.

The surfactant is contained in the organic phase in a quantity of more than 0.1 and preferably 0.5 to 5 % of the weight of the organic phase. By means of the surfactants used in accordance with the invention a water-in-oil emulsion can be prepared which has an adequate mechanical stability for use in the extraction of germanium and/or arsenic from highly acidic aqueous solutions in a continuous process and which is perfectly chemically stable for the adjustment of the pH value of the inner phase within a wide range from 0 to 14. For instance, the contact of the highly alkaline inner phase with the highly hydrochloric solution of the metal to be extracted will not cause the emulsion to break and will not result in a neutralization.

Usual acids, preferably mineral acids, with the exception of hydrochloric acid, are used to adjust the pH value of the inner phase in the acid range. Hydrochloric acid is not used for that purpose because it would induce a re-formation of germanium tetrachloride and arsenic trichloride. A pH value in the alkaline range can be adjusted by means of bases, such as alkali metal or alkaline earth metal hydroxides. Neutral pH values will be obtained by the use of distilled water alone. In the inner phase the germanium tetrachloride and the arsenic trichloride are hydrolyzed and are thus rendered unable to penetrate the organic phase (i.e. reverse migration is excluded). As a result, a concentration gradient is always maintained.

In the process in accordance with the invention, the volume ratio of the feed solution, i.e., the hydrochloric aqueous solution which contains germanium and/or arsenic, to the liquid membrane emulsion is adjusted to a value in the range from 10:1 to 1000:1.

In an operation in which the ratio of feed solution to the liquid membrane emulsion is high, the extraction process will be prolonged. For this reason a preferred embodiment of the invention calls for a ratio from 60:1 to 500:1. This shows that the process in accordance with the invention will be particularly economical if a large quantity of feed solution can be treated and selectively extracted with a minimum quantity of liquid membrane emulsion within the shortest time possible. The treating time is usually from 1 to 5 minutes.

For the economy of the process in accordance with the invention it is also essential to minimize the volume ratio of the organic outer phase to the aqueous inner phase of the liquid membrane emulsion. In the range of a volume ratio from 10:1 to 1:10, the range from 3:1 to 1:2 will be preferred.

The feed solution is treated with the liquid membrane emulsion in apparatus or extractors of known types, such as a pulsed sieve plate column, Karr column, Kühni column, or mixer-settler.

After a treating time which usually does not exceed 5 minutes the dispersion consisting of the liquid membrane emulsion in the virtually germanium and/or arsenic-free feed solution is transferred into a conventional settling tank and the depleted aqueous feed solution is separated.

The aqueous inner phase of the liquid membrane emulsion now contains virtually all of the germanium and/or arsenic. That emulsion is then broken by the exposure to an electric field between two insulated electrodes, which are disposed outside the emulsion. A voltage gradient in excess of 0.2 kV/cm is established and a frequency from 50 to 1000 Hz and a voltage from 1 to 20 Kv are employed. Suitable breaking conditions will be obtained, e.g., at 3 Kv and 1000 Hz or at 16 kV and 50 Hz.

BRIEF DESCRIPTION OF THE DRAWING

The above an other objects, features and advantages of the present invention will become more readily apparent from the following description, reference being made to the accompanying drawing in which:

FIG. 1a is a flow diagram embodying this device; and

SPECIFIC DESCRIPTION

Figure 1:
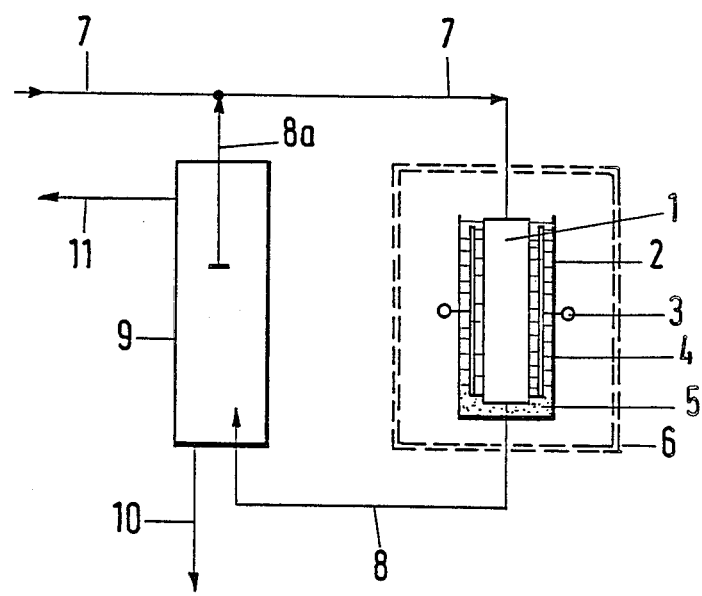
FIG. 1 is a diagram, partly in section, of an electric-field emulsion-breaking device according to the invention.

An apparatus which can be used in the process in accordance with the invention to effect a coalescence in enriched aqueous solutions that contain germanium and/or arsenic is shown in FIG. 1 and comprises an emulsion-breaking unit that comprises a breaking cell 1 provided with two electrodes 2, which are disposed on opposite sides outside the cell walls and adjacent thereto and terminals 3 for electric power.

The electrodes 2 and the breaking cell 1 are contained in a container 4, which is filled with an insulating medium 5, and are surrounded by a Faraday cage 6.

The apparatus also comprises a line 7 for supplying the emulsion to the breaking cell, a line 8 for withdrawing the coalesced liquid and for transferring it to a settling tank 9, a line 10 for withdrawing high-metal aqueous phase, a line 11 for withdrawing the membrane-forming organic phase, and means 8 for recirculating non-coalesced emulsion from the settling tank 9 and the breaking cell 1.

The material for the breaking cell consists of an electrically non-conducting material, such as plastic, glass or ceramics. When the emulsion has been broken in the breaking cell 1, the resulting phases are still coarsely mixed. A final separation is effected in the settling tank 9.

The breaking cell 1 is immersed in a suitably liquid insulating material 5, such as transformer oil, which is contained in the insulating vessel 4. The electrodes 2 of the voltage supply 3 are also immersed in the liquid insulating material and extend close to the outside surface of the breaking cell.

As is shown in FIG. 1a, virtually three liquid layers are formed in the settling tank 9, namely, an aqueous bottom layer (W) which has the highest specific gravity and has been enriched with the elements germanium and/or arsenic, an intermediate layer consisting of a liquid membrane emulsion E and a top layer consisting of an organic phase 0.

By means of the circulating system consisting of the breaking cell 1, line 8, settling tank 9, lines 8a and 7, emulsion E which has not been broken or has not been broken completely can continuously be fed to the breaking cell.

The aqueous inner phase which constitutes the aqueous layer that is enriched with germanium and/or arsenic is withdrawn from the settling tank 9 by gravity or by means of a pump and is supplied to a conventional further processing, e.g., to form the oxide.

The organic phase 0 is withdrawn from the settling tank 9 in line 11 and is optionally emulsified in the emulsifying vessel 14 with makeup organic solvent and additional aqueous phase and is recycled in line 16 to the extractor 13. In the unit 12, the HCl concentration of the aqueous feed solution which contains the substances to be recovered is adjusted. By means of the connecting line 15, any desired recirculation can be accomplished.

It is apparent that the process in accordance with the invention includes a combination of the following working stages:

By an addition of hydrochloric acid, the aqueous solution which contains germanium and/or arsenic is adjusted to a concentration in excess of 6 and preferably up to 10 moles/l HCl;

in an extraction apparatus the resulting solution is contacted with a liquid membrane emulsion, which consists of an aqueous inner phase in a state of extremely fine division in a membrane-forming organic phase, which is immiscible with the solution and the inner phase;

a volume ration of germanium and/or arsenic containing solution to liquid membrane solution in a preferred range from 60:1 to 500:1 and a volume ratio of the membrane-forming organic phase to the aqueous inner phase in a preferred range from 3:1 to 1:2 are adjusted;

the liquid membrane emulsion is separated from the solution which has been freed from germanium and/or arsenic;

by exposure to an electric field between two dually insulated electrodes the liquid membrane emulsion is broken; a voltage gradient in excess of 0.2 kV/cm, a frequency between 50 Hz and 1000 Hz and a voltage between 1 and 20 kV are employed;

the coalesced aqueous inner phase which is rich in germanium and/or arsenic is withdrawn; and the coalesced organic phase is recycled for use in the preparation of additional liquid membrane emulsion.

In the process in accordance with the invention the electrocoalescence can be accelerated by the selection of a suitable composition of the organic solvent used in the membrane-forming phase. The breaking rate, i.e. the space-time yield in a commercial process, can substantially be increased when the kerosine in the emulsion, is replaced in part by an aromatic solvent, such xylene or a short-chain aliphatic compound, such as hexane, or by a cycloaliphatic compound, such a methyl cyclohexane.

Compared to Conventional processes, the process in accordance with the invention affords a number of advantages:

(a) It can be performed in a fully continuous operation compared to a discontinuous operation which is necessary, e.g. where solid ion exchange resins are used or a precipitating reagent, such as tannin, is employed;

(b) there is no need for a regeneration of the organic phase. Such regeneration is necessary, e.g. in extraction/re-extraction processes such as are disclosed in Published German Application No. 24 23 355;

(c) differing from the processes mentioned in (a) and (b) a highly specific and highly selective physical transfer process is performed so that there is virtually no consumption of organic solvent and other chemicals by germanium and/or arsenic;

(d) because the physical transfer process is highly specific for germanium and/or arsenic, as contrasted with the conventional processes, the space-time yield is greatly increased;

(e) owing to the highly increased space-time yield, much less extracting solvent is used than in the conventional extracting/re-extracting processes using, e.g., carbon tetrachloride.

SPECIFIC EXAMPLES

The invention will be explained more in detail and by way of example in the following Examples.

EXAMPLE I 1200 ml of a solution containing 98 ppm Ge, 3235 ppm Cu, 6680 ppm Fe, 15,100 ppm Zn and 9 moles/l HCl were contacted in a stirred reactor with 20 ml of an emulsion consisting of a membrane-forming organic phase (10 ml of a solution of 3% by vol. $CCl_4$, 0.5% by volume of a PIBSA/polyamine condensation product in mineral oil (Paranox ®100 of Esso Chemical), 24.2% by volume xylene and 72.3% by volume kerosine, and an aqueous phase (10 ml $H_2O$), which is emulsified in that organic phase. Stirring was discontinued after 5 minutes. The coalesced emulsion was transferred into a test tube. A dually insulated rod electrode was immersed into the test tube in a central position. The test tube was encased in a grounded copper plate. The emulsion broke at a voltage of 16 kV at 50 Hz.

Ge. concentration of the aqueous inner phase amounted to 11.6 g/l. Metals other than the Ge were not detected. At the end of the test, the final concentration of the aqueous outer phase amounted to 0.3 pp. No Ge had been left in the organic phase.

Figure 2:
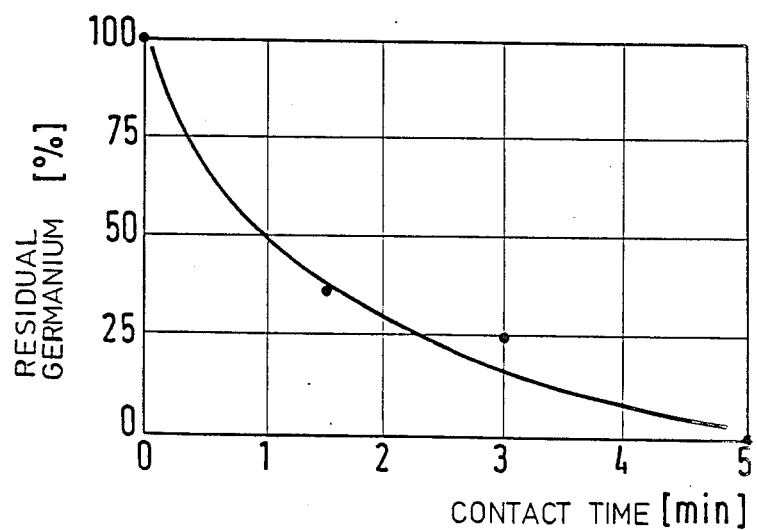

In FIG. 2 the decrease of the concentration of germanium in the outer aqueous phase is plotted against the contacting time.

EXAMPLE II

The arsenic solution used (1200 ml) contained 50 ppm As, 18 g/l Cu, 6 g/l Fe, 10 g/l Zn and 9 moles/l HCl. That solution was contacted with an emulsion consisting of a separating organic phase (10 ml of a solution of 2% by volume $CCl_4$, 0.6% by volume Paranox®100 (see Example I), 24.4% by volume xylene and 72.4% by volume kerosine) and an emulsified aqueous phase (10 ml $H_2O$). Stirring Was again discontinued after 5 minutes. As described in Example I, the collected emulsion was broken at a voltage of 3 kV and 1000 Hz.

The As concentration of the inner aqueous phase amounted to 5.9 g/l. Metals other than As were not detected in the enriched inner phase. At the end of the experiment, the final concentration of the outer aqueous phase amounted to 0.6 ppm. No arsenic had been left in the organic phase.

Figure 3:
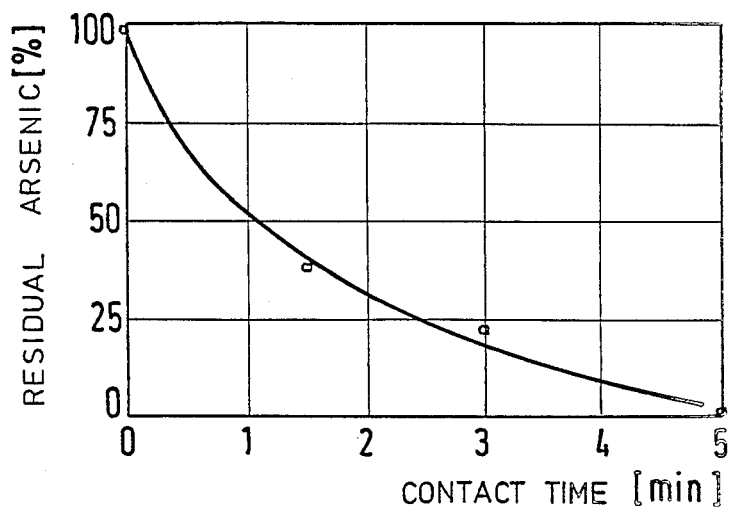

In FIG. 3 the decrease of the concentration of the arsenic in the outer aqueous phase is plotted against the contacting time.

EXAMPLE III

Figure 4:
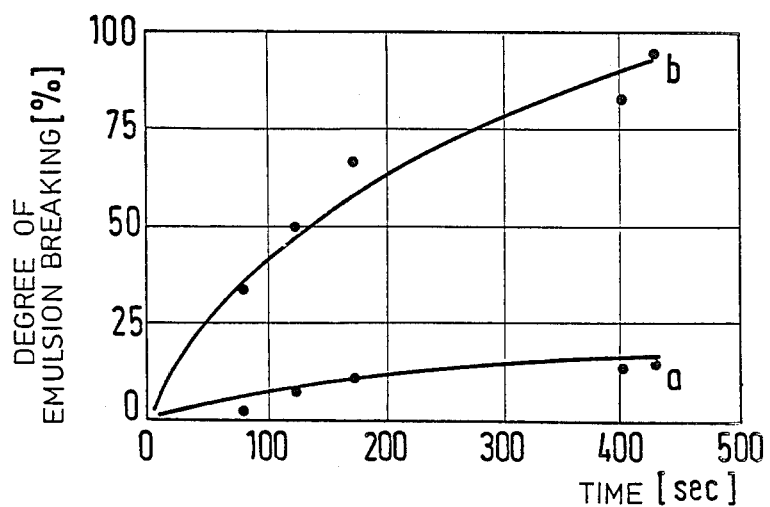

In preliminary tests relating to the breaking of the laden emulsion it was found that an emulsion in which the organic phase consisted of 1.0% by vol. Paranox®100, 1.0% by volume $CCl_4$ and 98% by volume kerosine can hardly be broken. On the other hand it was possible to effectively break those emulsions which in their organic phase contained kerosine as well as xylene. FIG. 4 shows how the breaking is considerably improved by an addition of xylene. Curve (a) represents the behavior of an emulsion which contains only kerosine as a solvent. Curve (b) is applicable to an emulsion which contains 24% by volume xylene.

EXAMPLE IV

A test was carried out to investigate the electrostatic emulsion breaking. 600 ml of an emulsion were prepared, which consisted of 300 ml of an aqueous phase (pH=4), which contained 6000 ppm Ge, and of 300 ml of an organic phase, which was composed of 74.0% by volume kerosine, 1.0% by volume $CCl_4$, 0.5% by volume Paranox®100 and 24.5% by volume xylene. The emulsifying time amounted to 4 minutes.

Figure 5:
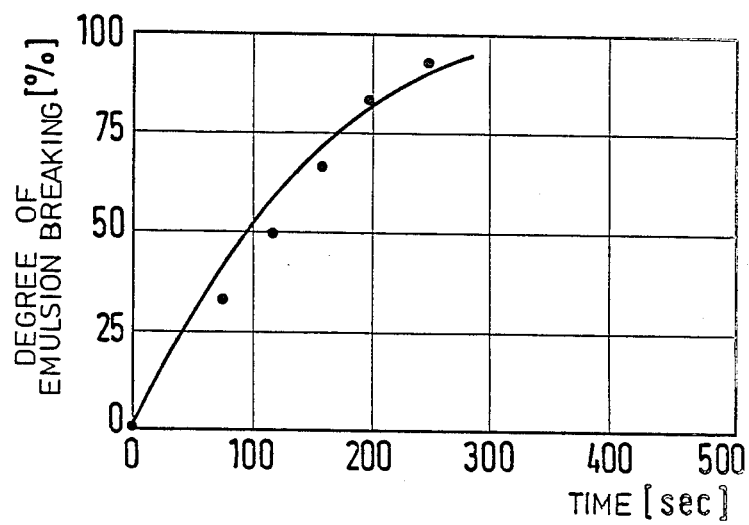
FIGS. 2-5 are graphs illustrating the results of the Examples.

The emulsion which has thus been prepared was broken by an exposure to an electric field at 3 kV and 1000 Hz in the apparatus shown in FIG. 1. The progress of the breaking is plotted against time in FIG. 5. The emulsion had been broken almost completely after about 5 minutes.

We claim:

1. A process for selectively recovering germanium or arsenic from an aqueous solution thereof by liquid membrane technology, comprising the steps of:
    (a) converting in said aqueous solution germanium or arsenic to germanium tetrahalide or arsenic trihalide as a solute in said aqueous solution by adding sufficient hydrohalic acid to provide a concentration of said hydrohalic acid in said aqueous solution in excess of 6 moles per liter, the halide being chloride or bromide and the hydrohalic acid being hydrochloric acid or hydrobromic acid;
    (b) forming an emulsion of droplets having an aqueous inner phase surrounded by a surfactant-containing outer phase immiscible with said aqueous solution and forming a membrane selectively permeable to said solute, including in said outer phase as a surfactant a polyisobutylenesuccinic anhydride/poly amine condensation product, and adjusting the pH of said aqueous inner phase with a pH modifying agent free from the halide of the solute to be removed from said aqueous solution to a level within the range of 0 to 14 and such that solute traversing said outer phase will react in said inner phase and be rendered incapable of again traversing said outer phase;
    (c) contacting said aqueous solution of step (a) with said emulsion and permitting said solute to pass through said surfactant-containing outer phase and react within said aqueous inner phase so as to be incapable of again traversing said outer phase, thereby depleting said solute from said solvent;
    (d) thereafter separating said emulsion from said aqueous solution from which said solute has been depleted;
    (e) breaking the emulsion separated from the aqueous solution in step (d) by causing droplets of said emulsion to coalesce upon exposure to an electrostatic field;
    (f) removing germanium or arsenic from the coalesced aqueous inner phases of said droplets upon the breaking of said emulsion in step (f) to recover an aqueous phase depleted in germanium or arsenic; and
    (g) re-emulsifying the recovered aqueous phase of step (f) with said outer phase and recycling the resulting emulsion to step (c).

2. The process defined in claim 1 wherein said halide is chloride, said hydrohalic acid is hydrochloric acid and said aqueous solution is acidified to a concentration of up to 10 moles of hydrogen chloride per liter.

3. The process defined in claim 2 wherein, in step (b), the volume ratio of the surfactant-containing outer phase to the aqueous inner phase of the emulsion is adjusted to a value of 10:1 to 1:10.

4. The process defined in claim 3 wherein said ratio is adjusted to a value of 3:1 to 1:2.

5. The process defined in claim 2 wherein the volume ratio of said aqueous solution to said emulsion in step (c) is adjusted to a value of 10:1 to 1000:1.

6. The process defined in claim 5 wherein said ratio is adjusted to a value of 60:1 to 500:1.

7. The process defined in claim 2 wherein said surfactant-containing outer phase contains at least one water-immiscible solvent selected from the group which consists of:
saturated aliphatic hydrocarbons,
aromatic and cycloaliphatic hydrocarbons,
halogenated aliphatic hydrocarbons having 1 to 5 carbon atoms, and
halogenated liquid mononuclear aromatic hydrocarbons.

8. The process defined in claim 7 wherein said surfactant-containing outer phase contains a solvent mixture consisting essentially of a predominantly straight-chain $C_{16}$–$C_{10}$ hydrocarbon, a halogenated $C_1$–$C_5$ hydrocarbon and a mononuclear aromatic hydrocarbon.

9. The process defined in claim 1 wherein said emulsion is broken in step (e) by exposing said emulsion to said electrostatic field between two insulated electrodes disposed outside said emulsion.

10. The process defined in claim 1 wherein said emulsion is broken in step (e) by exposing said emulsion to said electrostatic field which is generated by a voltage of 1 to 20 kV and has a voltage gradient in excess of 0.2 kV/cm and a frequency of 50 to 1000 Hz.

* * * * *